United States Patent
Chu et al.

(10) Patent No.: US 7,414,731 B2
(45) Date of Patent: Aug. 19, 2008

(54) MICROSCOPE AND INTERFEROMETER THEREOF

(75) Inventors: Jen-You Chu, Changhua County (TW); Juen-Kai Wang, Taipei (TW); Tien-Jen Wang, Taipei (TW); Yu-Jen Lu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 128 days.

(21) Appl. No.: 11/613,113

(22) Filed: Dec. 19, 2006

(65) Prior Publication Data

US 2008/0007823 A1 Jan. 10, 2008

(30) Foreign Application Priority Data

Jul. 10, 2006 (TW) .............................. 95125074 A (51) Int. Cl.
*G01B 11/02* (2006.01)
(52) U.S. Cl. .................... 356/501; 356/521; 250/237 G
(58) Field of Classification Search ................ 356/501, 356/488, 499, 521; 250/237 G
See application file for complete search history.

(56) References Cited

U.S. PATENT DOCUMENTS

| 259,252 | A | | 6/1882 | Wessells | |
|---|---|---|---|---|---|
| 5,164,791 | A | * | 11/1992 | Kubo et al. | 356/494 |
| 6,919,561 | B2 | * | 7/2005 | Lee et al. | 250/237 G |
| 7,053,390 | B2 | * | 5/2006 | Shiraishi | 250/548 |
| 2006/0170932 | A1 | * | 8/2006 | Hayashi et al. | 356/495 |

FOREIGN PATENT DOCUMENTS

| DE | 100 35 134 A1 | 2/2002 |
|---|---|---|
| EP | 0 394 668 A1 | 10/1990 |

* cited by examiner

*Primary Examiner*—Tarifur R Chowdhury
*Assistant Examiner*—Jonathan M Hansen
(74) *Attorney, Agent, or Firm*—Quintero Law Office (57) ABSTRACT

An interferometer comprises a light source unit, a first splitter, a reference beam unit and a detection unit. The light source unit provides a laser beam. The first splitter receives the laser beam from the light source unit and splits the laser beam into a first beam and a second beam. The reference beam unit comprises a frequency shifter, a stopper and a spherical mirror. A center of the frequency shifter is located on a curvature center of the spherical mirror, the first beam traveling from the first splitter to the frequency shifter, the frequency shifter splitting the first beam into a diffraction beam and a zero-order beam, wherein the diffraction beam travels to the spherical mirror, reflected by the spherical mirror toward the frequency shifter, passing the frequency shifter to become a reference beam, and the zero-order beam is stopped by the stopper. The detection unit receives the reference beam from the reference beam unit.

26 Claims, 11 Drawing Sheets

MICROSCOPE AND INTERFEROMETER THEREOF

BACKGROUND OF THE INVENTION

1. Field of the Invention

The invention relates to a microscope, and in particular to a microscope utilizing multi-wavelength laser beams.

2. Description of the Related Art

Figure 1A:
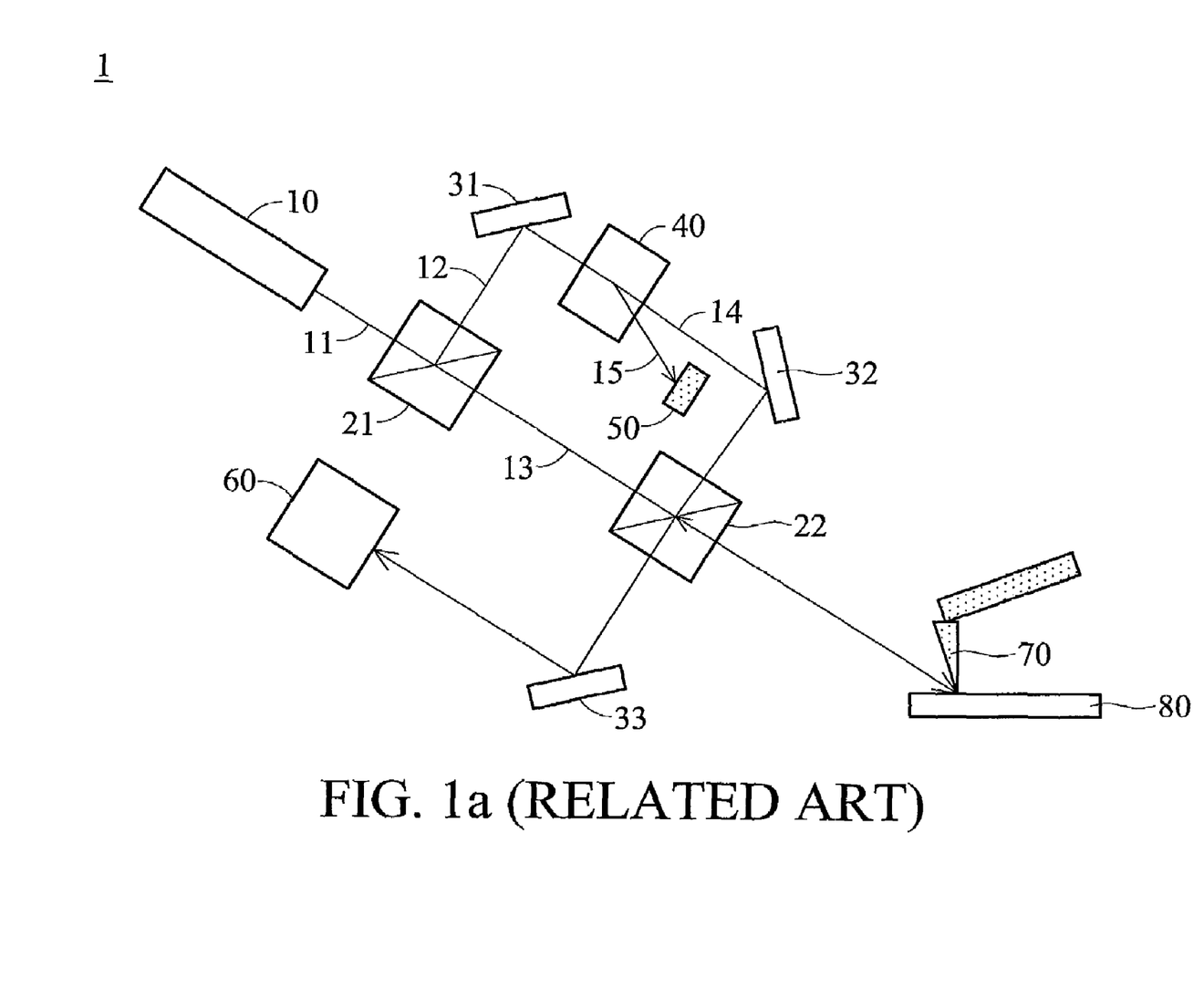
FIG. 1a shows a conventional microscope.

FIG. 1a shows a conventional microscope 1 comprising a light source unit 10, a splitter 21, a splitter 22, a reflector 31, a reflector 32, a reflector 33, a frequency shifter 40, a stopper 50, a photoelectric detector 60 and probe 70. A laser beam 11 is emitted from light source unit 10, passing splitter 21 and split into a first beam 12 and a second beam 13. First beam 12 is reflected by reflector 31 toward frequency shifter 40, and split into a diffraction beam 14 and a zero-order beam 15. Zero-order beam 15 is stopped by stopper 50. Diffraction beam 14 passes reflector 32, splitter 22 and reflector 33 to photoelectric detector 60. Second beam 13 passes splitter 22 to probe 70 to detect sample 80.

Figure 1B:
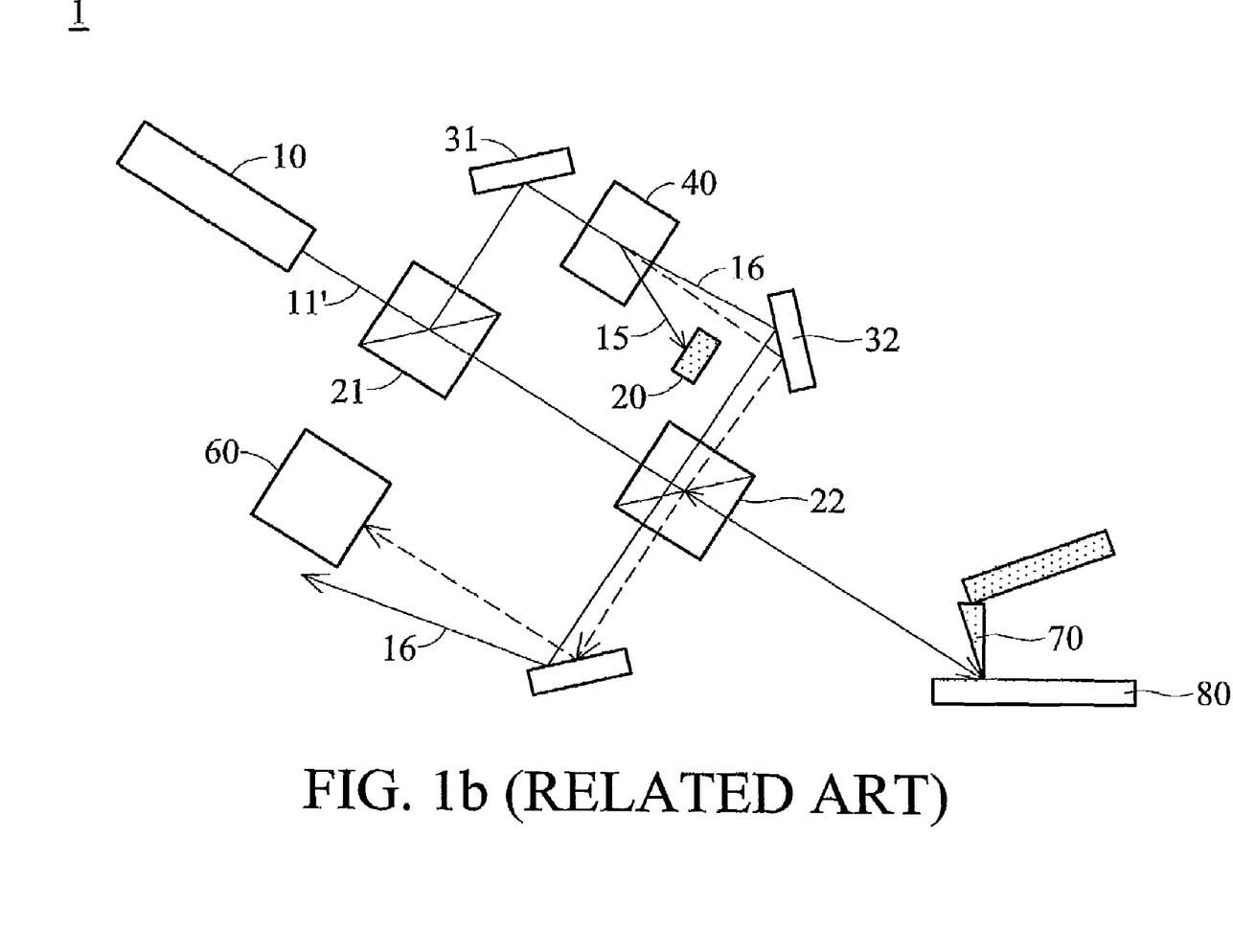
FIG. 1b shows a laser beam with improper wavelength utilized in conventional microscope.

When a wavelength of incident laser changes, the direction of diffraction beam of laser changes correspondingly to fail the interferometer. With reference to FIG. 1b, when laser beam 11' with improper wavelength is projected to frequency shifter 40, a corresponding diffraction beam 16 is generated. However, the light path of diffraction beam 16 is different from diffraction beam 14. The difference in wavelength of laser beam changes the corresponding light path thereof. Diffraction beam 16 cannot be projected onto photoelectric detector 60. Thus, conventional interferometer microscope 1 only can detect a sample with a single-wavelength laser beam, not a multi-wavelength laser beam.

BRIEF SUMMARY OF THE INVENTION

A detailed description is given in the following embodiments with reference to the accompanying drawings.

The invention relates to an interferometer comprising a light source unit, a first splitter, a reference beam unit and a detection unit. The light source unit provides a laser beam. The first splitter receives the laser beam from the light source unit and splits the laser beam into a first beam and a second beam. The reference beam unit comprises a frequency shifter, a stopper and a spherical mirror. A center of the frequency shifter is located on a curvature center of the spherical mirror, the first beam traveling from the first splitter to the frequency shifter, the frequency shifter splitting the first beam into a diffraction beam and a zero-order beam, wherein the diffraction beam travels to the spherical mirror, reflected by the spherical mirror toward the frequency shifter, passing the frequency shifter to become a reference beam, and the zero-order beam is stopped by the stopper. The detection unit receives the reference beam from the reference beam unit.

The microscope utilizing the interferometer of the invention can detect samples with different wavelength of laser beams.

BRIEF DESCRIPTION OF THE DRAWINGS

The invention can be more fully understood by reading the subsequent detailed description and examples with references made to the accompanying drawings, wherein:

FIG. 3b shows a corresponding reference beam according to the laser beam in FIG. 3a;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention relates to an interferometer comprising a light source unit, a first splitter, a reference beam unit and a detection unit. The light source unit provides a laser beam. The first splitter receives the laser beam from the light source unit and splits the laser beam into a first beam and a second beam. The reference beam unit comprises a frequency shifter, a stopper and a spherical mirror. A center of the frequency shifter is located on a curvature center of the spherical mirror, the first beam traveling from the first splitter to the frequency shifter, the frequency shifter splitting the first beam into a diffraction beam and a zero-order beam, wherein the diffraction beam travels to the spherical mirror, reflected by the spherical mirror toward the frequency shifter, passing the frequency shifter to become a reference beam, and the zero-order beam is stopped by the stopper. The detection unit receives the reference beam from the reference beam unit.

The interferometer of the invention can be utilized in scattering-type scanning near-field optical microscopy (s-SNOM), apertureless scanning near-field optical microscopy, photon tunneling microscopy, near-field plasmon microscopy, etc.

Figure 2A:
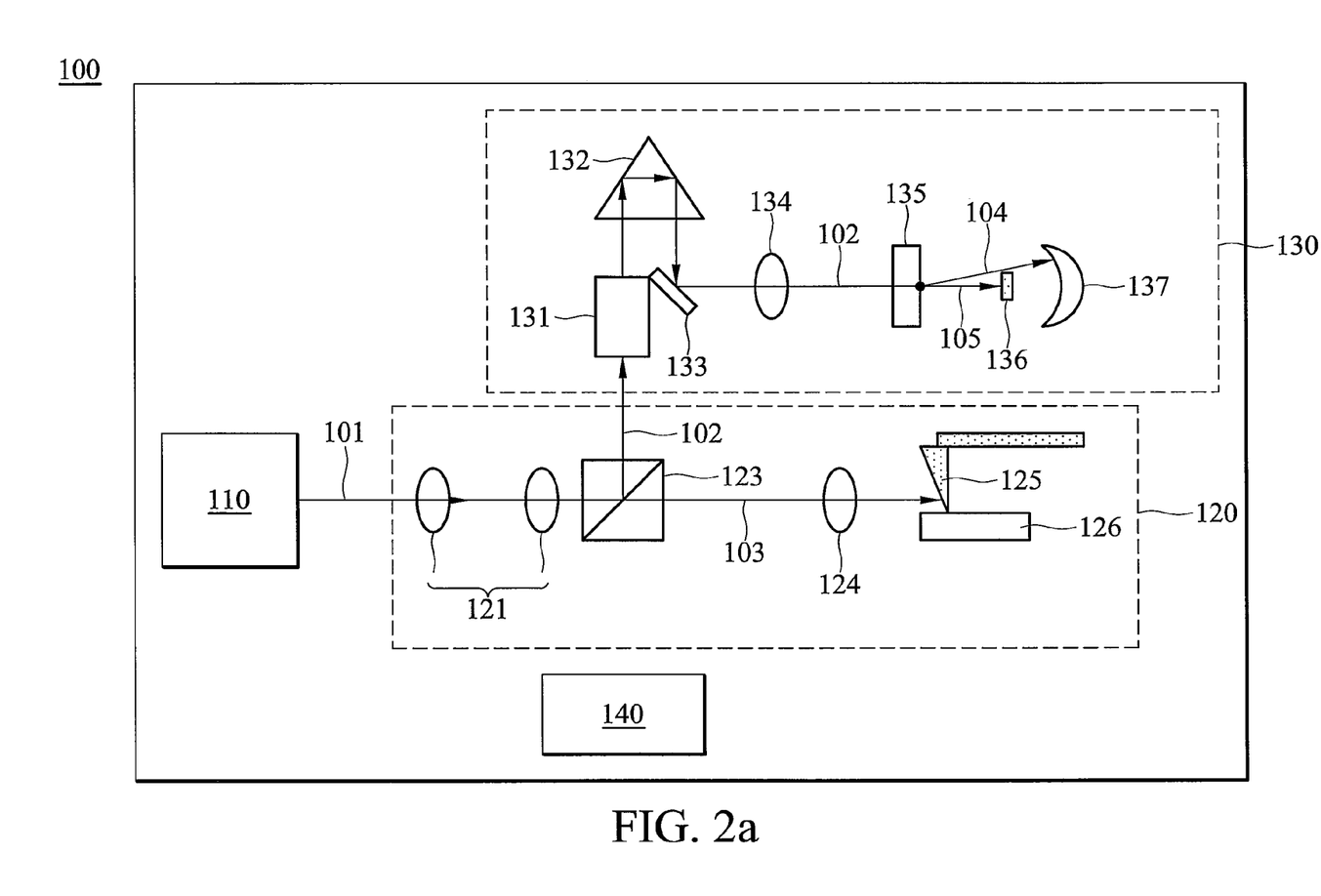
FIG. 2a shows a microscope of a first embodiment of the invention.

FIG. 2a shows a microscope 100 of a first embodiment utilizing the interferometer of the invention, comprising a light source unit 110, a major optical unit 120, a reference beam unit 130 and a detection unit 140. The major optical unit 120 comprises an expanding lens module 121, a first splitter 123, a focusing lens 124 and a probe 125. The reference beam unit 130 comprises an expanding lens module 131 (providing expanding and focusing functions according to the direction of beam), a rectangular prism 132, a reflector 133, a lens 134, an acoustoptic frequency shifter 135, a stopper 136 and a spherical mirror 137. The light source unit 110 provides a laser beam 101. The laser beam 101 passes the expanding lens module 121 to the first splitter 123. The first splitter 123 splits the laser beam 101 into a first beam 102 and a second beam 103. The first beam 102 passes the expanding lens module 131, the rectangular prism 132, the reflector 133, the lens 134, and is focused on the acoustooptic frequency shifter 135. The acoustooptic frequency shifter 135 splits the first beam 102 into a diffraction beam 104 and a zero-order beam 105. The diffraction beam 104 is projected to the spherical mirror 137. The zero-order beam 105 is stopped by stopper 136. The second beam 103 passes the focusing lens 124 projected on the probe 125 to detect the sample 126.

The laser beam 101 comprises a first frequency W, the frequency shifter 135 provides a frequency shift F, the diffraction beam 104 comprises a second frequency W+F, and a diffraction angle thereof is a function of a wavelength 11 of the laser beam 104. The frequency of the zero-order beam 105 is equal to the first frequency W.

Figure 2B:
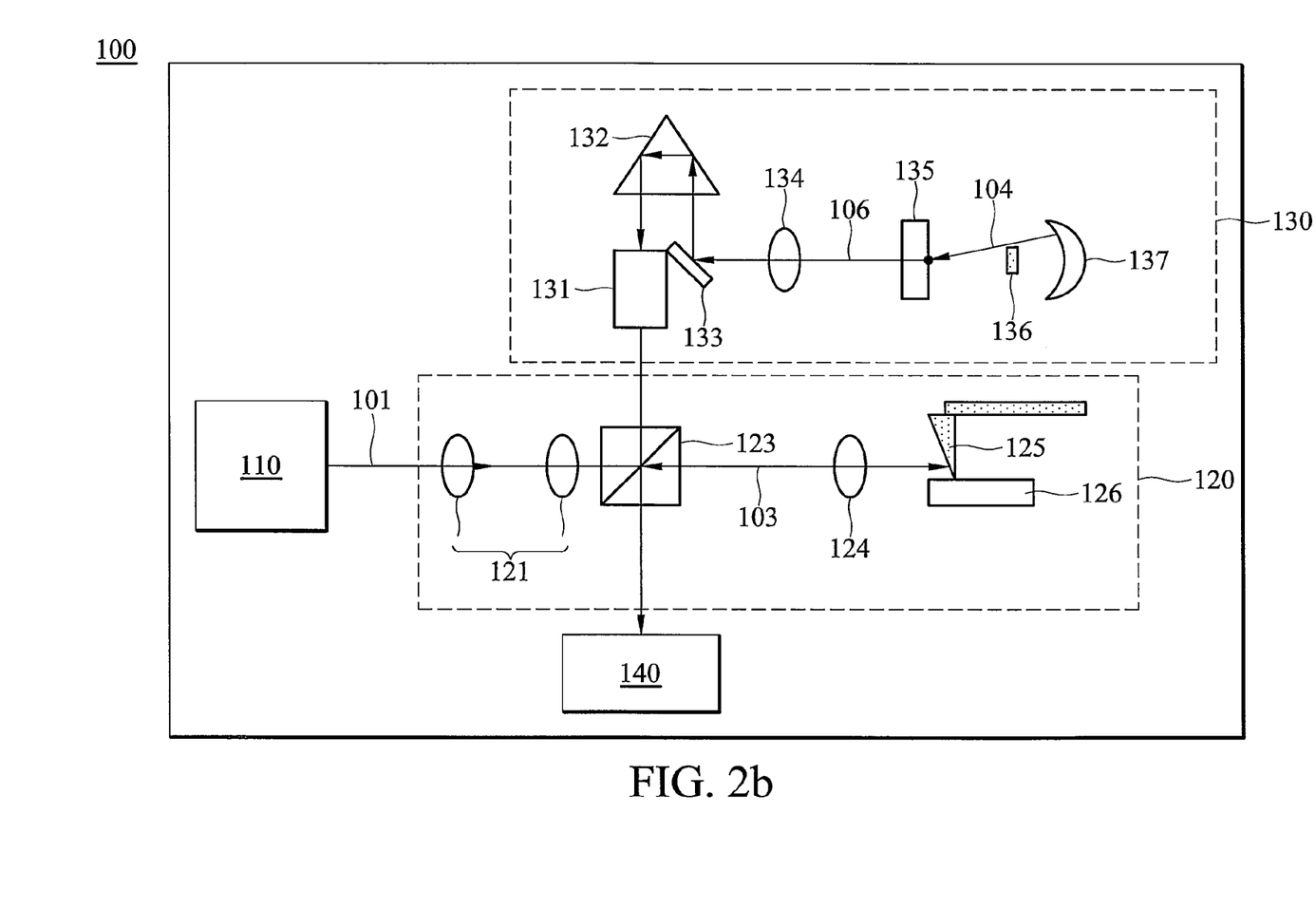
FIG. 2b shows a reference beam generated in the first embodiment.

The lens 134 comprises a focal length $R_1$, the spherical mirror 137 comprises a radius $R_2$, and the focal length $R_1$ equals the radius $R_2$. A center of the acoustooptic frequency shifter 135 is located on a curvature center of the spherical mirror 137. With reference to FIG. 2b, when the diffraction beam 104 is reflected by the spherical mirror 137, the diffraction beam 104 travels along the original path back to the center of the acoustooptic frequency shifter 135 to become a reference beam 106. The reference beam 106 comprises a third frequency W+2F. The reference beam 106 travels from the acoustooptic frequency shifter 135, passing the lens 134, the reflector 133, the rectangular prism 132, the expanding lens module 131 and the first splitter 123 to the detection unit 140.

Figure 3A:
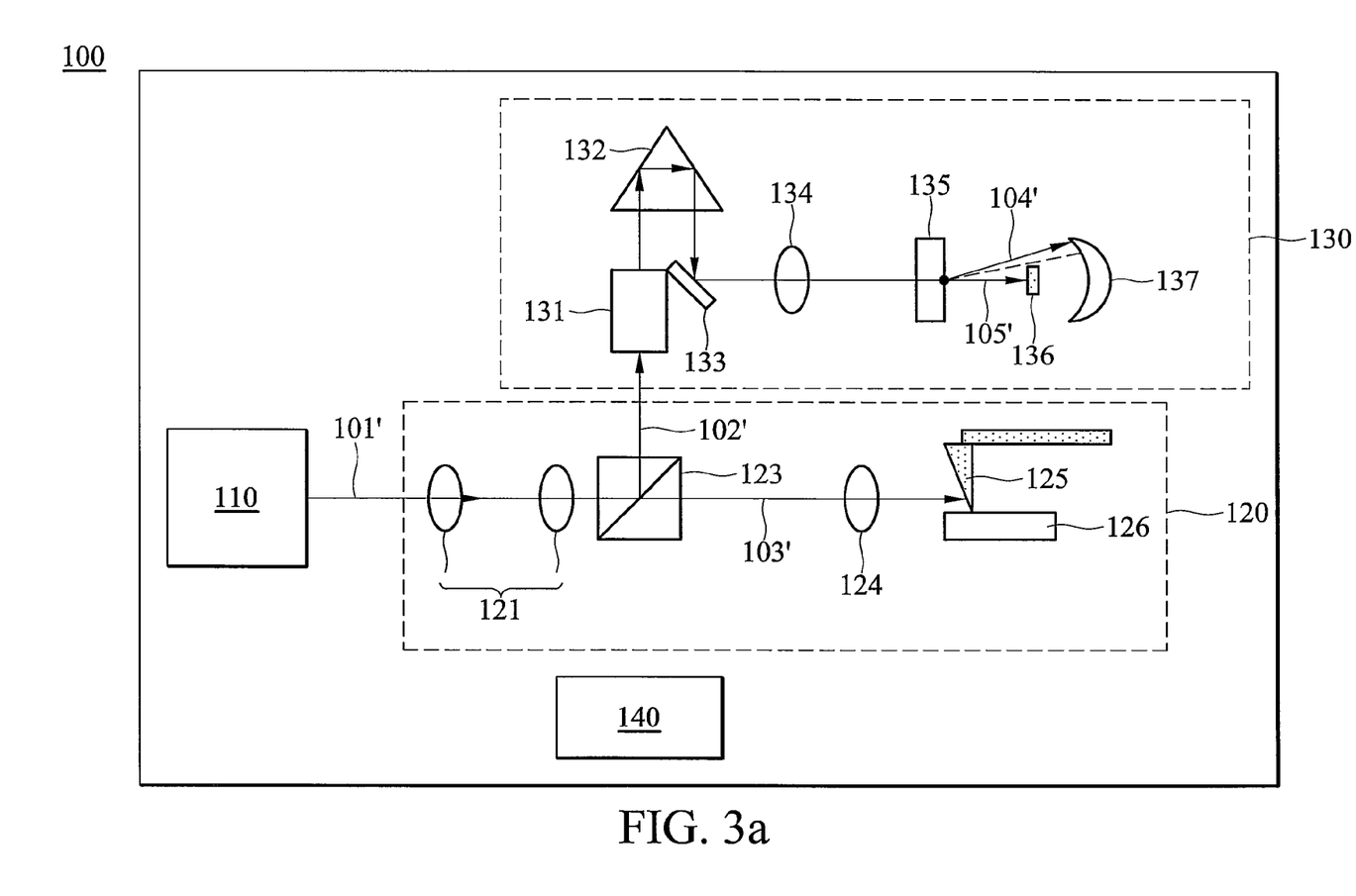
FIG. 3a shows a laser beam with a different wavelength utilized in the first embodiment.
Figure 3B:
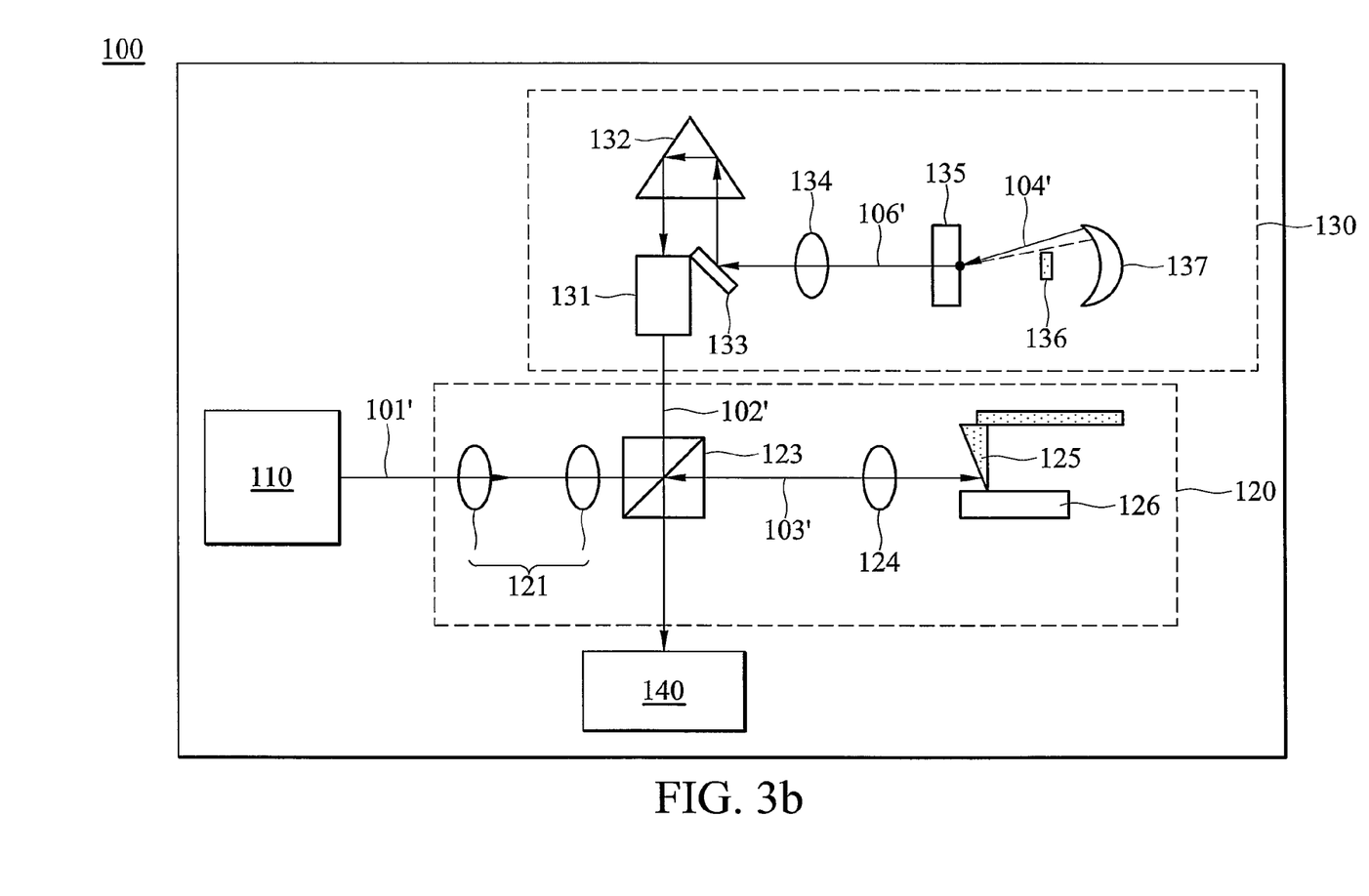

The microscope 100 of the invention utilizes multi-wavelength laser beams. With reference to FIG. 3a, a laser beam 101' with a wavelength $\lambda_2$ is utilized in detection, it is split by the first splitter 123 into a first beam 102' and a second beam 103'. The acoustooptic frequency shifter 135 splits the first beam 102' into a diffraction beam 104' and a zero-order beam 105'. The wavelength of the laser beam 101' is different from the wavelength of the laser beam 101. Thus, the projection location of the diffraction beam 104' on the spherical mirror 137 is different from that of the diffraction beam 104. However, because the center of the acoustooptic frequency shifter 135 is located on the curvature center of the spherical mirror 137, with reference to FIG. 3b, the diffraction beam 104' is reflected by the spherical mirror toward the center of the acoustooptic frequency shifter 135 to become a reference beam 106'.

The microscope of the invention therefore can detect samples with different wavelength of laser beams.

Figure 4:
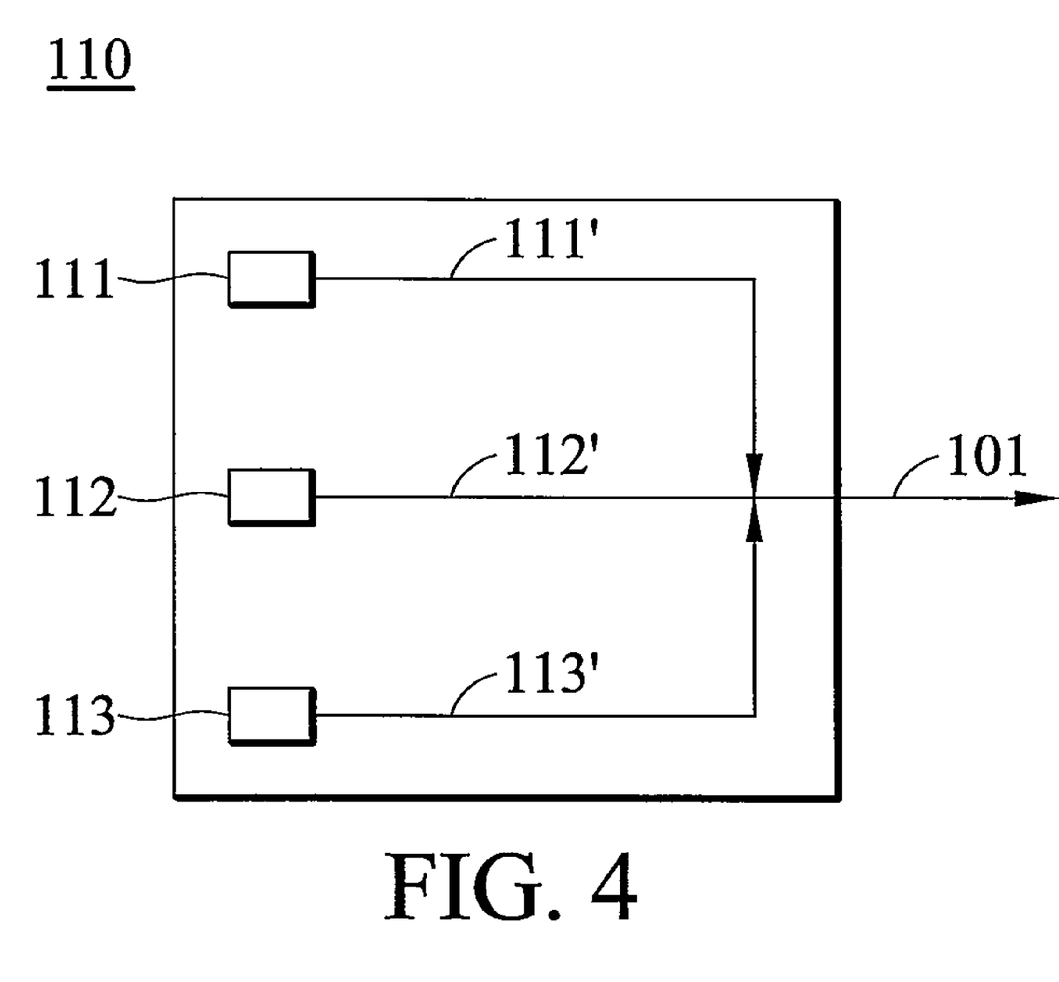
FIG. 4 shows a detailed structure of a light source unit.

FIG. 4 shows a detailed structure of the light source unit 110, comprising a first light source 111, a second light source 112 and a third light source 113. The first light source 111 provides a frequency stabilized laser 111'. The second light source 112 provides a multi-wavelength laser 112'. The third light source 113 provides a pulsed laser 113'. The frequency stabilized laser 111' can be a frequency stabilized He—Ne laser. The multi-wavelength laser 112' can be a multi-wavelength Argon laser. The pulsed laser 113' can be a Ti-sapphire laser. The frequency stabilized laser 111' is base beam and calibrated beam. The multi-wavelength laser 112' provides multi-wavelength property. The pulsed laser 113' provides continuous white light source.

The detection unit 140 comprises a photoelectric detector to receive data in the light beams projected thereto.

Figure 5A:
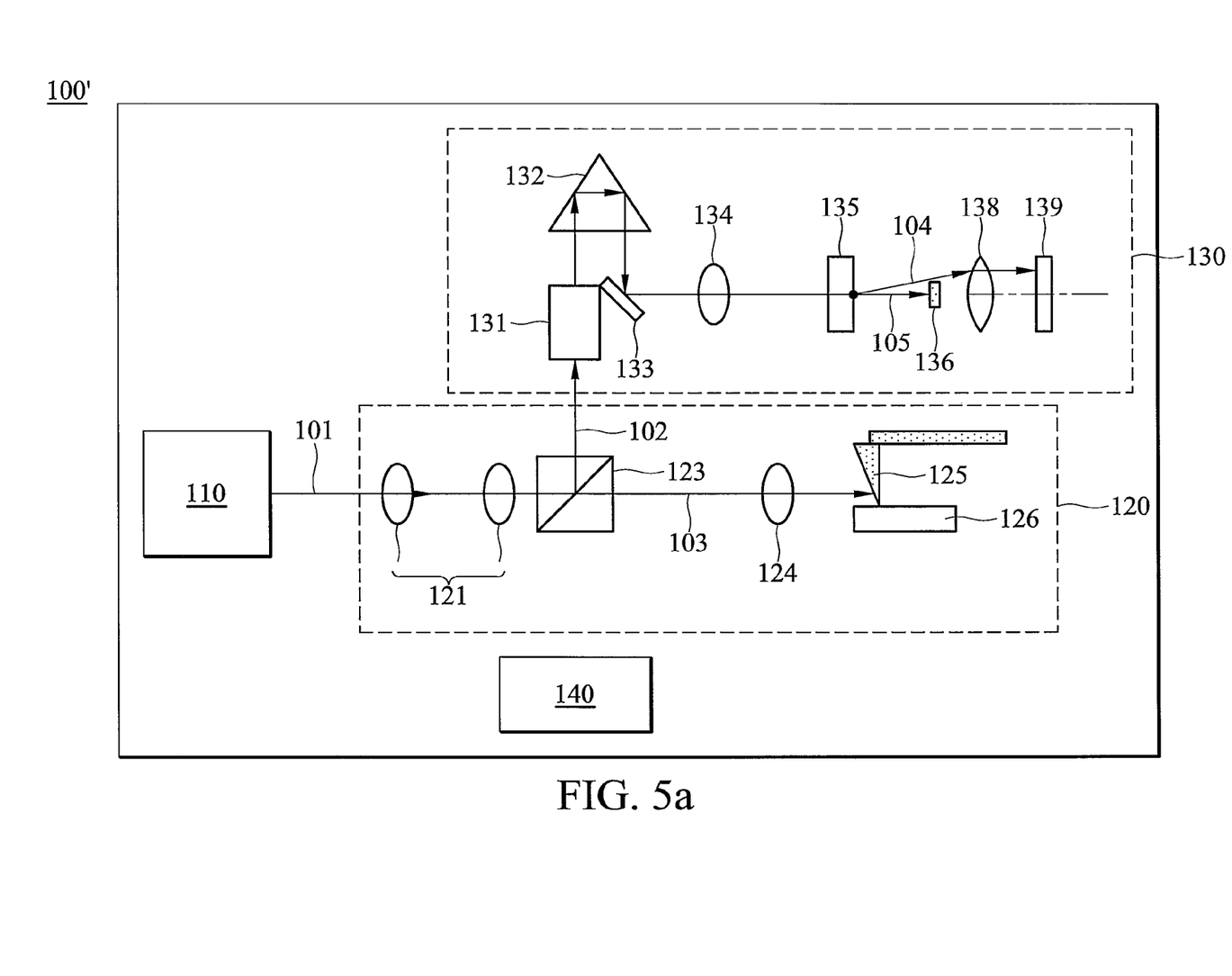
FIGS. 5a and 5b show a modified embodiment of the invention.
Figure 5B:
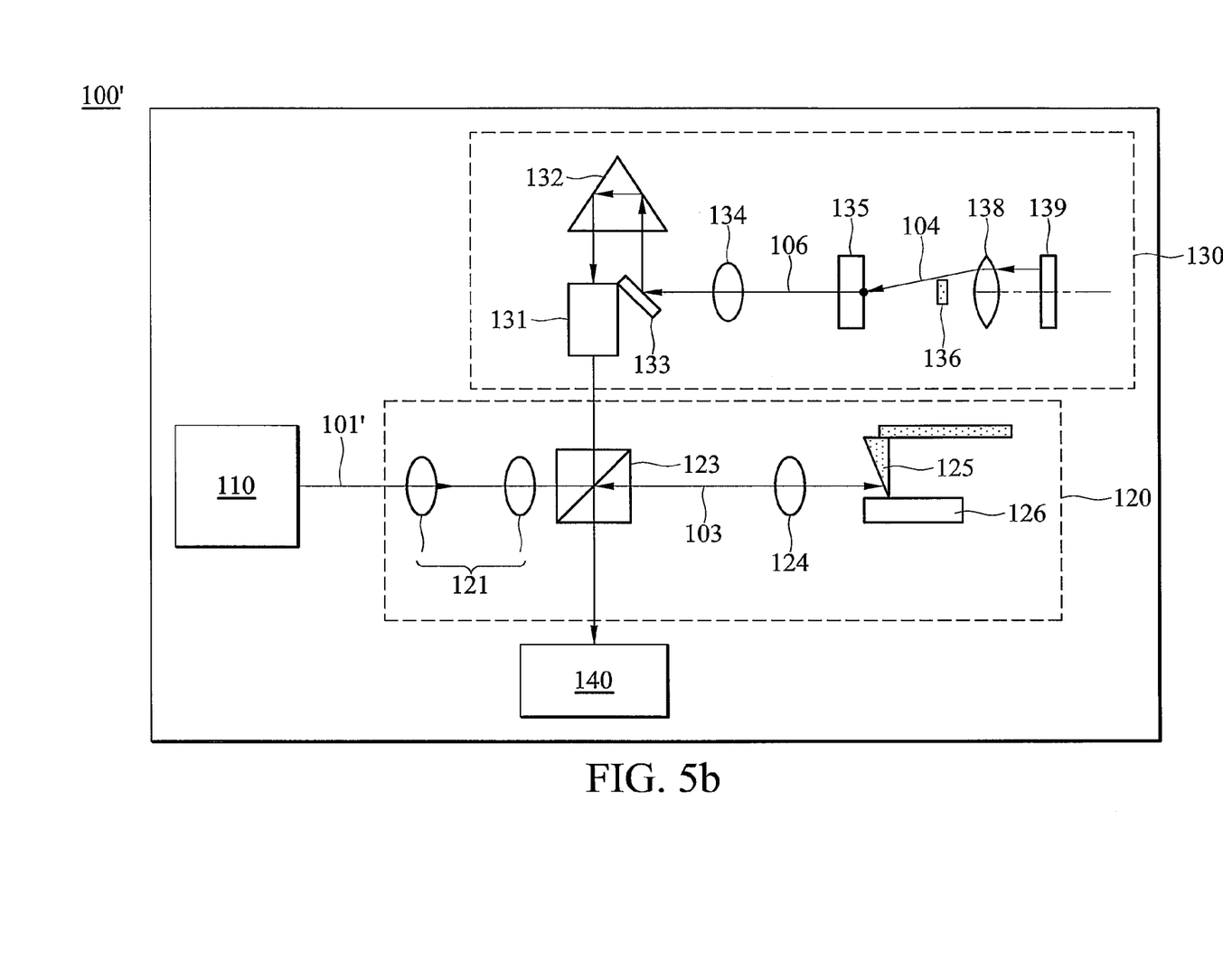

FIG. 5a shows a microscope 100' of a modified embodiment of the invention, wherein the spherical mirror is replaced by a convex lens 138 and a reflector 139. The center of the acoustooptic frequency shifter 135 is located on a focal point of the convex lens 138. With reference to FIG. 5b, when the diffraction beam 104 is reflected by the reflector 139, the diffraction beam 104 travels along the original path, passing the convex lens 138 back to the center of the acoustooptic frequency shifter 135 to become a reference beam 106.

Figure 6A:
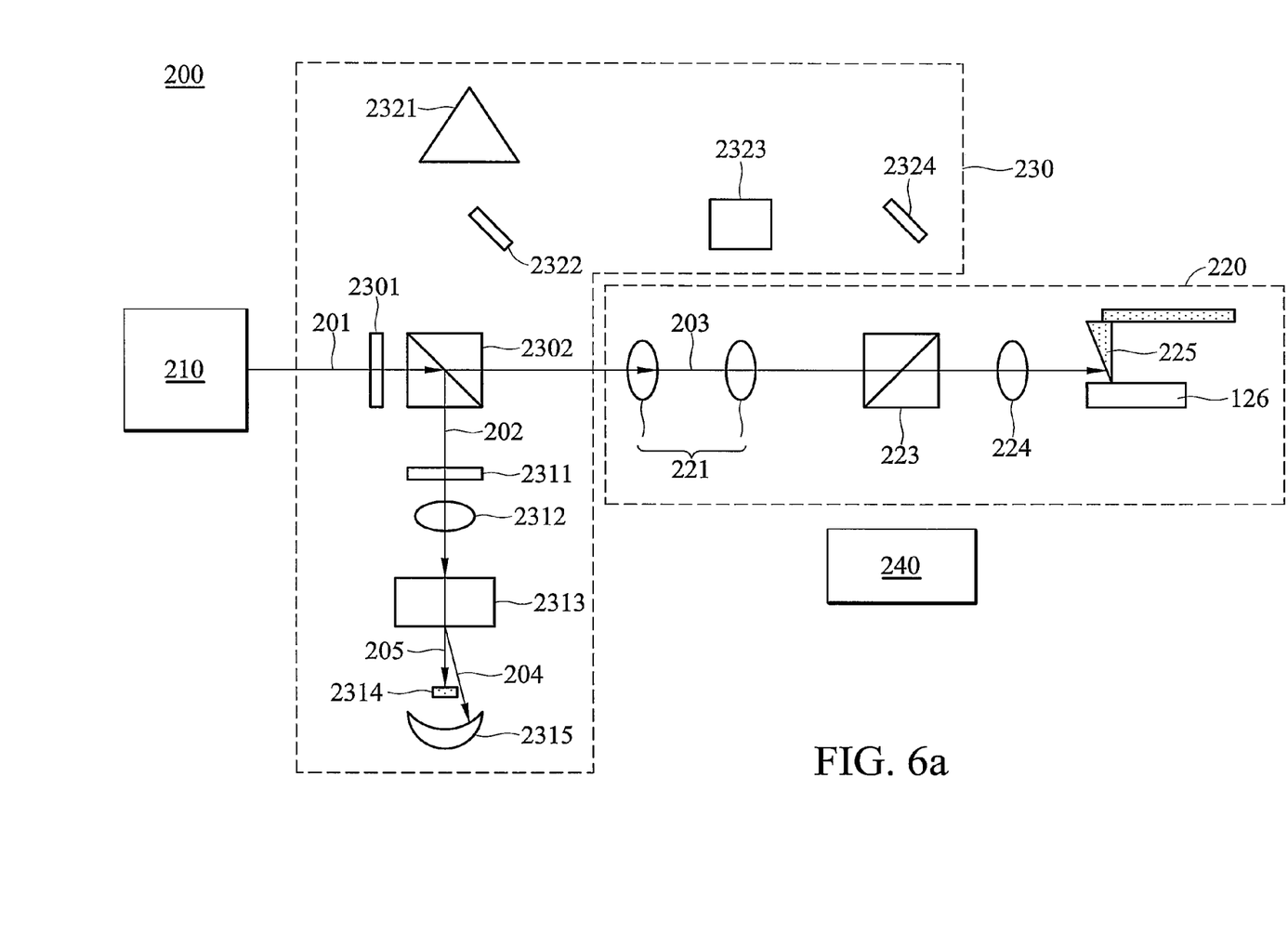
FIG. 6a shows a microscope of a second embodiment of the invention.

FIG. 6a shows a microscope 200 of a second embodiment of the invention, comprising a light source unit 210, a major optical unit 220, a reference beam unit 230 and detection unit 240. The major optical unit 220 comprises an expanding lens module 221, a second splitter 223, a focusing lens 224 and a probe 225. The reference beam unit 230 comprises a half-wave plate 2301, a first splitter 2302, a quarter-wave plate 2311, a lens 2312, an acoustooptic frequency shifter 2313, a stopper 2314, a spherical mirror 2315, a rectangular prism 2321, a reflector 2322, an expanding lens module 2323 and a reflector 2324. The laser beam 201 passes the half-wave plate 2301 to the first splitter 2302. The first splitter 2302 splits the laser beam 201 into a first beam 202 and a second beam 203. The first beam 202 passes the quarter-wave plate 2311, the lens 2312 and focuses on the acoustooptic frequency shifter 2313. The acoustooptic frequency shifter 2313 splits the first beam 202 into a diffraction beam 204 and a zero-order beam 205. The diffraction beam 204 is projected to the spherical mirror 2315. The zero-order beam 205 is stopped by the stopper 2314. The second beam 203 passes the expanding lens module 221, the second splitter 223 and focusing lens 224 to the probe 225 to detect sample 126.

In the second embodiment, the first splitter 2302 is a linear polarization splitter.

The laser beam 201 comprises a first frequency W, the frequency shifter 2313 provides a frequency shift F, the diffraction beam 204 comprises a second frequency W+F, and a diffraction angle thereof is a function of a wavelength $\lambda_1$ of the laser beam. The frequency of the zero-order beam 205 is equal to the first frequency W.

Figure 6B:
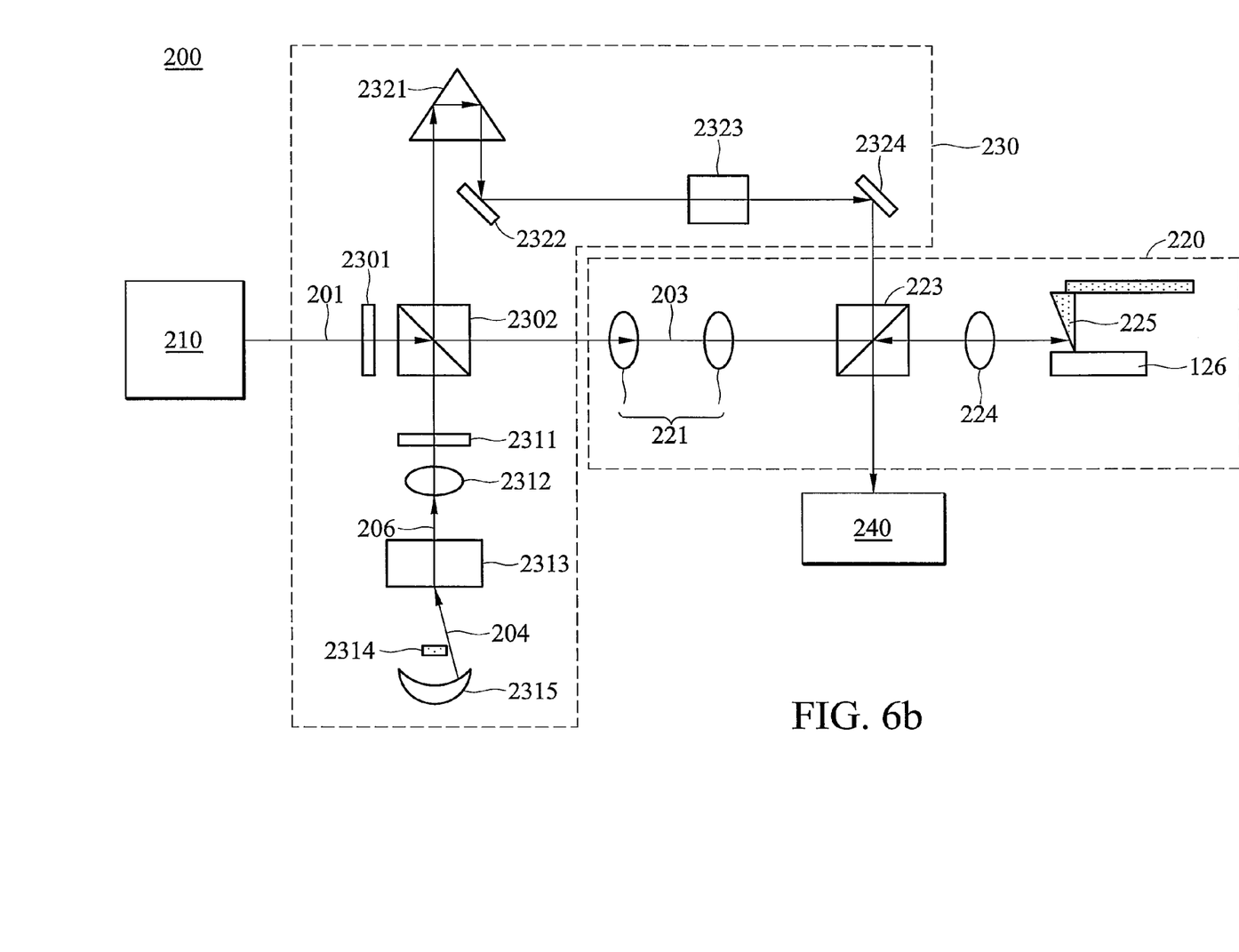
FIG. 6b shows a reference beam generated in the second embodiment.

The lens 2312 comprises a focal length $R_1$, the spherical mirror 2315 comprises a radius $R_2$, and the focal length $R_1$ equals the radius $R_2$. A center of the acoustooptic frequency shifter 2313 is located on a curvature center of the spherical mirror 2315. With reference to FIG. 6b, when the diffraction beam 204 is reflected by the spherical mirror 2315, the diffraction beam 204 travels along the original path back to the center of the acoustooptic frequency shifter 2313 to become a reference beam 206. The reference beam 206 comprises a third frequency W+2F. The reference beam 206 travels from the acoustooptic frequency shifter 2313, passing the lens 2312, the quarter-wave plate 2311, the first splitter 2302, the rectangular prism 2321, the reflector 2322, the expanding lens module 2323, the reflector 2324 and the second splitter 223 to the detection unit 240.

The microscope 200 comprises a different light path from that of the microscope 100. Additionally, the microscope 200 has lower noise.

The lenses in the embodiments are achromatic lenses.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An interferometer, comprising
a light source unit, providing a laser beam;
a first splitter, receiving the laser beam from the light source unit and splitting the laser beam into a first beam and a second beam;
a reference beam unit, comprising a frequency shifter, a stopper and a spherical mirror, a center of the frequency shifter located on a curvature center of the spherical mirror, the first beam traveling from the first splitter to the frequency shifter, the frequency shifter splitting the first beam into a diffraction beam and a zero-order beam, wherein the diffraction beam travels to the spherical mirror, reflected by the spherical mirror toward the frequency shifter, passing the frequency shifter to become a reference beam, and the zero-order beam is stopped by the stopper; and a detection unit, receiving the reference beam from the reference beam unit.

2. The interferometer as claimed in claim 1, wherein the laser beam comprises a first frequency W, the frequency shifter provides a frequency shift F, the diffraction beam comprises a second frequency W+F, and a diffraction angle thereof is a function of a wavelength $\lambda_1$ of the laser beam.

3. The interferometer as claimed in claim 2, wherein a frequency of the zero-order beam is equal to the first frequency W.

4. The interferometer as claimed in claim 2, wherein the reference beam comprises a third frequency W+2F.

5. The interferometer as claimed in claim 2, wherein the laser beam comprises a frequency stabilized laser, a multi-wavelength laser and a pulsed laser.

6. The interferometer as claimed in claim 5, wherein the frequency stabilized laser is a frequency stabilized He—Ne laser.

7. The interferometer as claimed in claim 5, wherein the multi-wavelength laser is a multi-wavelength Argon laser.

8. The interferometer as claimed in claim 5, wherein the pulsed laser is a Ti-sapphire laser.

9. A microscope, comprising:
the interferometer as claimed in claim 1;
an expanding lens module;
a focusing lens; and
a probe, wherein the laser beam travels from the light source unit, passing the expanding lens module to the first splitter, the first splitter splitting the laser beam into the first beam and the second beam, and the second beam passing the focusing lens to the probe.

10. The microscope as claimed in claim 9, wherein the reference beam travels from the reference beam unit, passing the first splitter to the detection unit.

11. A microscope, comprising:
the interferometer as claimed in claim 1;
a second splitter;
an expanding lens module;
a focusing lens; and
a probe, wherein the laser beam travels from the light source unit, passing the first splitter, the first splitter splitting the laser beam into the first beam and the second beam, the second beam passing the expanding lens module, the second splitter and the focusing lens to the probe.

12. The microscope as claimed in claim 11, wherein the reference beam travels from the reference beam unit, passing the second splitter to the detection unit.

13. The microscope as claimed in claim 11, further comprising a half-wave plate disposed between the light source unit and the first splitter, wherein the first splitter is a linear polarization splitter.

14. An interferometer, comprising
a light source unit, providing a laser beam;
a first splitter, receiving the laser beam from the light source unit and splitting the laser beam into a first beam and a second beam;
a reference beam unit, comprising a frequency shifter, a stopper, a convex lens and a reflective mirror, a center of the frequency shifter located on a focal point of the convex lens, the first beam traveling from the first splitter to the frequency shifter, the frequency shifter splitting the first beam into a diffraction beam and a zero-order beam, wherein the diffraction beam passes the convex lens, reflected by the reflective mirror toward the frequency shifter, passing the frequency shifter to become a reference beam, and the zero-order beam is stopped by the stopper; and a detection unit, receiving the reference beam from the reference beam unit.

15. The interferometer as claimed in claim 14, wherein the laser beam comprises a first frequency W, the frequency shifter provides a frequency shift F, the diffraction beam comprises a second frequency W+F, and a diffraction angle thereof is a function of a wavelength $\lambda_1$ of the laser beam.

16. The interferometer as claimed in claim 15, wherein a frequency of the zero-order beam is equal to the first frequency W.

17. The interferometer as claimed in claim 15, wherein the reference beam comprises a third frequency W+2F.

18. The interferometer as claimed in claim 14, wherein the laser beam comprises a frequency stabilized laser, a multi-wavelength laser and a pulsed laser.

19. The interferometer as claimed in claim 18, wherein the frequency stabilized laser is a frequency stabilized He—Ne laser.

20. The interferometer as claimed in claim 18, wherein the multi-wavelength laser is a multi-wavelength Argon laser.

21. The interferometer as claimed in claim 18, wherein the pulsed laser is a Ti-sapphire laser.

22. A microscope, comprising:
the interferometer as claimed in claim 14;
an expanding lens module;
a focusing lens; and
a probe, wherein the laser beam travels from the light source unit, passing the expanding lens module to the first splitter, the first splitter splitting the laser beam into the first beam and the second beam, and the second beam passing the focusing lens to the probe.

23. The microscope as claimed in claim 22, wherein the reference beam travels from the reference beam unit, passing the first splitter to the detection unit.

24. A microscope, comprising:
the interferometer as claimed in claim 14;
a second splitter;
an expanding lens module;
a focusing lens; and
a probe, wherein the laser beam travels from the light source unit, passing the first splitter, the first splitter splitting the laser beam into the first beam and the second beam, the second beam passing the expanding lens module, the second splitter and the focusing lens to the probe.

25. The microscope as claimed in claim 24, wherein the reference beam travels from the reference beam unit, passing the second splitter to the detection unit.

26. The microscope as claimed in claim 24, further comprising a half-wave plate disposed between the light source unit and the first splitter, wherein the first splitter is a linear polarization splitter.

* * * * *